(12) United States Patent
Sharma et al.

(10) Patent No.: US 11,233,460 B2
(45) Date of Patent: Jan. 25, 2022

(54) MODULAR MATRIX AC/AC MULTIPOINT CONVERTER HAVING HIGHER-FREQUENCY TRANSFORMERS

(71) Applicant: SIEMENS AKTIENGESELLSCHAFT, Munich (DE)

(72) Inventors: Kunal Sharma, Erlangen (DE); German Kuhn, Erlangen (DE); Alexander Rentschler, Bensheim (DE); Martin Pieschel, Altdorf (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 16/977,166

(22) PCT Filed: Mar. 1, 2018

(86) PCT No.: PCT/EP2018/055093
§ 371 (c)(1),
(2) Date: Sep. 1, 2020

(87) PCT Pub. No.: WO2019/166096
PCT Pub. Date: Sep. 6, 2019

(65) Prior Publication Data
US 2021/0067049 A1    Mar. 4, 2021

(51) Int. Cl.
*H02M 5/22* (2006.01)
*H02M 5/297* (2006.01)
*H02M 7/483* (2007.01)

(52) U.S. Cl.
CPC ........... *H02M 5/225* (2013.01); *H02M 5/297* (2013.01); *H02M 7/4835* (2021.05)

(58) Field of Classification Search
CPC ..... H02M 5/225; H02M 5/297; H02M 7/4835
See application file for complete search history.

(56) References Cited

U.S. PATENT DOCUMENTS

2008/0198637 A1*  8/2008  Meysenc ............... H02M 7/219
                                                          363/67
2013/0201733 A1*  8/2013  Divan ................... H02M 5/225
                                                          363/39

(Continued)

FOREIGN PATENT DOCUMENTS

| CN | 102545644 B | 7/2014 |
| EP | 2458725 A1 | 5/2012 |
| WO | WO2017016594 A1 | 2/2017 |

OTHER PUBLICATIONS

Kenzelmann Stephan et al: "A versatile DC-DC converter for energy collection and distribution using the Modular Multilevel Converter", 2011 14th European Conference on Power Electronics and Applications (EPE 2011); Birmingham, United Kingdom, Aug. 30-Sep. 1, 2011, pp. 1-10, XP055396299, Piscataway, NJ ;ISBN: 978-1-61284-167-0; fig. 3; 2011.

*Primary Examiner* — Jue Zhang
(74) *Attorney, Agent, or Firm* — Laurence A. Greenberg; Werner H. Stemer; Ralph E. Locher

(57) ABSTRACT

A converter arrangement converts an alternating input voltage having an input frequency into an alternating output voltage having an output frequency. The converter arrangement includes a direct converter on an input side having a plurality of input terminals and input-side converter units, transformers, the number of which matches the number of input terminals, and a direct converter on an output side having output-side converter units, and a number of output terminals, which number matches the number of input terminals. Each transformer is connected on the primary side to each input terminal via one each input-side converter unit, and is connected on the secondary side to each output terminal via one each output-side converter unit.

15 Claims, 2 Drawing Sheets

(56) References Cited

U.S. PATENT DOCUMENTS

| | | | |
|---|---|---|---|
| 2018/0198377 A1* | 7/2018 | Keister | H02M 1/42 |
| 2019/0252989 A1* | 8/2019 | Toliyat | H02M 1/4258 |
| 2019/0280586 A1* | 9/2019 | Chen | H02J 3/18 |

* cited by examiner

MODULAR MATRIX AC/AC MULTIPOINT CONVERTER HAVING HIGHER-FREQUENCY TRANSFORMERS

BACKGROUND OF THE INVENTION

Field of the Invention

The invention relates to a converter arrangement and a method for converting an input AC voltage into an output AC voltage and coupling a generator to a power supply system.

Generators which are coupled to a power supply system are often operated with the line frequency of the power supply system. In order to transmit the electrical energy over long distances, the generator voltage which is generated by a generator is usually transformed to a higher transmission voltage. Alternatively, the generator voltage is rectified and transmitted.

The underlying object of the invention is to specify a converter arrangement and a method for converting an input AC voltage into an output AC voltage which are in particular suitable for coupling a generator to a power supply system, wherein the frequency of the generator voltage is different from the line frequency of the power supply system.

SUMMARY OF THE INVENTION

The object is achieved according to the invention by a converter arrangement as claimed, a method as claimed and the use of a converter arrangement of this type as claimed. Advantageous configurations of the invention are the subject matter of the subclaims.

A converter arrangement according to the invention for converting an input AC voltage with an input frequency into an output AC voltage with an output frequency comprises a direct converter on the input side with a plurality of input connections and converter units on the input side, a number of transformers which corresponds to the number of input connections, and a direct converter on the output side with a number of output connections which corresponds to the number of input connections and with converter units on the output side. Each transformer is connected on the primary side to each input connection via a converter unit on the input side in each case and is connected on the secondary side to each output connection via a converter unit on the output side in each case.

A direct converter, which is also described as a matrix converter, carries out a voltage conversion and frequency conversion in a so-called matrix which optionally connects each output phase to an input phase via a switching path.

In particular, a converter arrangement according to the invention makes it possible to convert an input AC voltage into an output AC voltage, the output frequency of which is different from the input frequency of the input AC voltage. The converter arrangement is therefore in particular suitable for coupling a generator to a power supply system, the line frequency of which deviates from the frequency of the generator voltage.

One configuration of the invention makes provision for each converter unit on the input side to have a plurality of circuit branches which are connected in parallel, wherein each circuit branch has a plurality of switching modules which are connected in series and which each have a full bridge circuit with four switching units and a bridge branch capacitor which is arranged in the bridge branch of the full bridge circuit. In this case, on the transformer side, a circuit branch coil can be connected in series to each circuit branch of each converter unit on the input side. A further configuration of the invention makes provision for each converter unit on the output side to have a plurality of switching modules which are connected in series and which each have a full bridge circuit with four switching units and a bridge branch capacitor which is arranged in the bridge branch of the full bridge circuit. The switching units each have a bipolar transistor with an insulated gate electrode (IGBT=insulated-gate bipolar transistor) and a free-wheeling diode which is connected in parallel thereto, for example.

The modular structure of the converter units from switching modules makes it possible to adapt the design of the converter arrangement to the desired input AC voltages and output AC voltages and input AC currents and output AC currents. Designing the switching modules as a full bridge circuit with four switching units results in the switching modules being able to be connected in a simple manner, which simplifies the modular structure. A circuit branch coil which in each case is connected in series to a circuit branch on the transformer side advantageously makes it possible to smooth and limit the currents and voltages of the circuit branch on the output side.

Further configurations of the invention make provision for an input coil to be connected between each converter unit on the input side and the input connection connected to said converter unit, and/or for an intermediate coil to be connected between each converter unit on the output side and the transformer connected to said converter unit, and/or for an output coil to be connected between each converter unit on the output side and the output connection connected to said converter unit.

The aforementioned configurations of the invention advantageously make it possible to smooth and limit the currents and voltages of the converter units on the input side or the currents and voltages, on the output side, of the converter units on the output side.

A further configuration of the invention makes provision for the converter arrangement to be designed for converting an input AC voltage into an output AC voltage, the output frequency of which is different from the input frequency of the input AC voltage. A converter arrangement of this type is in particular suitable for coupling a generator to a power supply system, the line frequency of which is different from the frequency of the generator voltage.

In the method according to the invention, an input AC voltage with an input frequency is converted into an output AC voltage with an output frequency by means of a converter arrangement according to the invention. In this case, the input frequency is increased to an intermediate frequency with the direct converter on the input side and the intermediate frequency is transformed to the output frequency with the direct converter on the output side. The intermediate frequency is preferably significantly higher than the input frequency, for example it is a multiple of the input frequency, e.g. five times or six times the input frequency. Increasing the input frequency to an intermediate frequency makes it possible for the transformers which are connected between the two direct converters to be smaller than if the input frequency were not increased to the intermediate frequency.

Furthermore, the invention makes provision for the use of a converter arrangement according to the invention for coupling a generator to a power supply system, wherein the converter arrangement is connected to the generator on the input side and is connected to the power supply system on the output side. In particular, each phase of a generator output voltage of the generator is connected to an input connection of the converter arrangement, and each phase of a line voltage of the power supply system is connected to an output connection of the converter arrangement, for example via a coupling transformer. The advantages of this use of a converter arrangement according to the invention are set forth in the abovementioned advantages of a converter arrangement according to the invention.

BRIEF DESCRIPTION OF THE SEVERAL VIEWS OF THE DRAWING

The characteristics, features and advantages of this invention which are described above as well as the manner in which they are achieved become clearer and easier to understand in relation to the subsequent description of exemplary embodiments which are explained in greater detail in relation to the drawings. In the drawings.

DETAILED DESCRIPTION OF THE INVENTION

Figure 1:
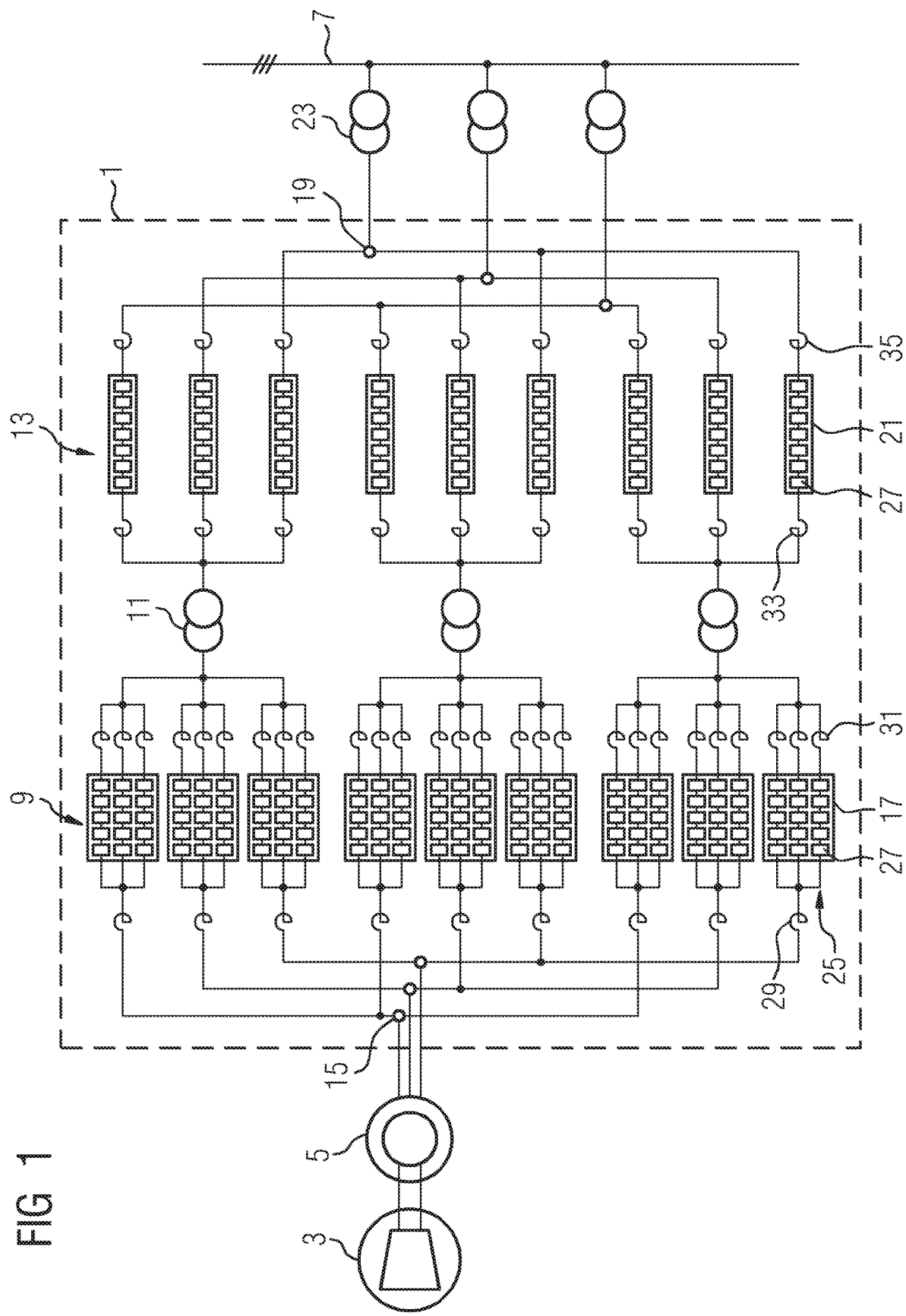
FIG. 1 shows a circuit diagram of a converter arrangement.

FIG. 1 shows a circuit diagram of an exemplary embodiment of a converter arrangement 1 according to the invention which couples a three-phase generator 5 powered by a turbine 3 to a three-phase power supply system 7.

The converter arrangement 1 has a direct converter 9 on the input side, three transformers 11 and a direct converter 13 on the output side. The converter 9 on the input side and the converter 13 on the output side are in particular each configured as a multilevel converter (also described as a modular multilevel converter) in the exemplary embodiment, more specifically as a multilevel matrix converter (also described as a modular multilevel matrix converter).

The direct converter 9 on the input side has three input connections 15 and nine converter units 17 on the input side. Each input connection 15 is connected to a phase of a generator output voltage of the generator 5.

The direct converter 13 on the output side has three output connections 19 and nine converter units 21 on the output side. Each output connection 19 is connected to a phase of a line voltage of the power supply system 7 via a coupling transformer 23.

Each transformer 11 is connected on the primary side to each input connection 15 via a converter unit 17 on the input side in each case and is connected on the secondary side to each output connection 19 via a converter unit 21 on the output side in each case.

Each converter unit 17 on the input side has three circuit branches 25 which are connected in parallel, wherein each circuit branch 25 has five switching modules 27 which are connected in series.

An input coil 29 is connected between each converter unit 17 on the input side and the input connection 15 connected to said converter unit, which input coil is connected to all of the circuit branches 25. On the transformer side, a circuit branch coil 31 is connected in series to each circuit branch 25 of each converter unit 17 on the input side.

Each converter unit 21 on the output side has seven switching modules 27 which are connected in series and which are each designed like a switching module 27 of a converter unit 17 on the input side.

An intermediate coil 33 is connected between each converter unit 21 on the output side and the transformer 11 connected to said converter unit. An output coil 35 is connected between each converter unit 21 on the output side and the output connection 19 connected to said converter unit.

A generator output voltage is generated by the generator 5, which generator output voltage is the input AC voltage of the converter arrangement 1. The converter arrangement 1 converts the input AC voltage into an output AC voltage with an output frequency which corresponds to the line frequency of the power supply system 7 and is different from the input frequency of the input AC voltage. The input frequency is increased to an intermediate frequency with the direct converter 9 on the input side. The intermediate frequency is transformed to the output frequency with the direct converter 13 on the output side. For example, the input frequency is 50 Hz, the intermediate frequency is 300 Hz and the output frequency is 60 Hz.

Figure 2:
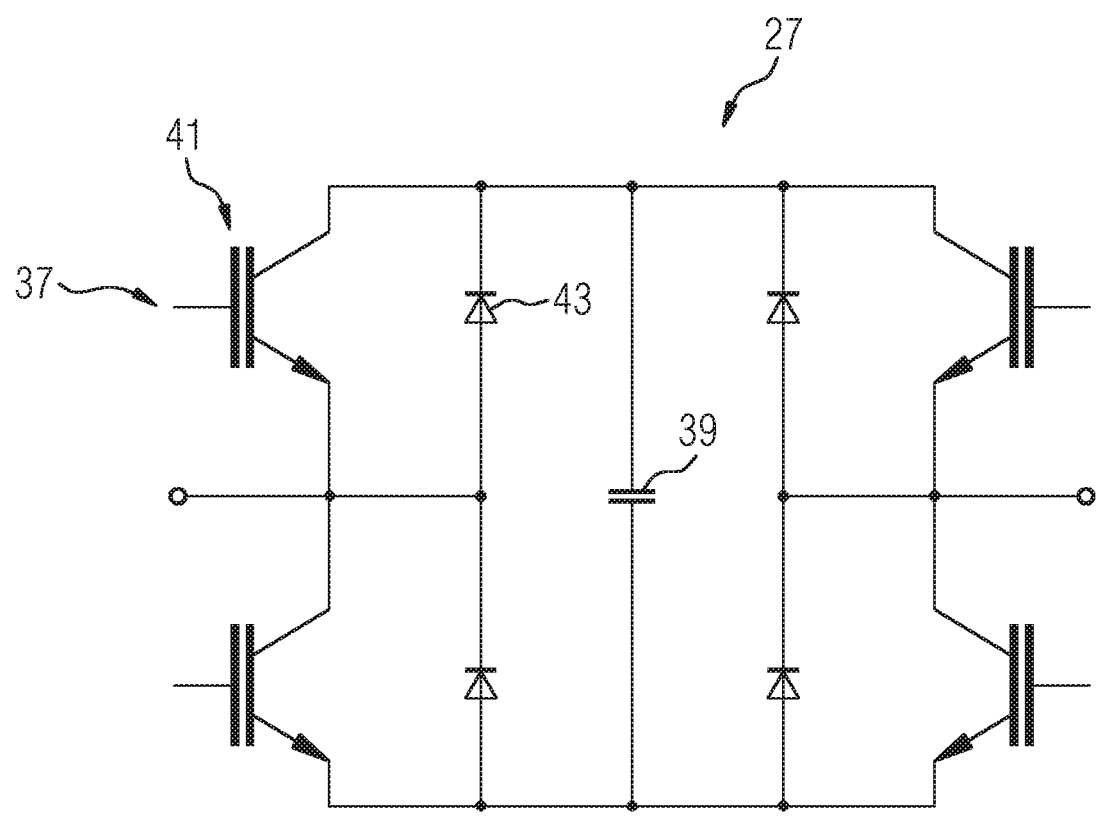
FIG. 2 shows a circuit diagram of a switching module.

FIG. 2 shows a circuit diagram of a switching module 27. The switching module 27 has a full bridge circuit with four switching units 37 and a bridge branch capacitor 39 which is arranged in the bridge branch of the full bridge circuit. Each switching unit 37 has a bipolar transistor 41 with an insulated gate electrode (IGBT=insulated-gate bipolar transistor) and a free-wheeling diode 43 which is connected in parallel thereto. The bipolar transistors 41 are controlled by a control unit which is not depicted.

The exemplary embodiment of a converter arrangement 1 shown in the figures can be modified in various ways. For example, the input coils 29 can be dispensed with if windings of the generator 5 have sufficient inductance. The circuit branch coils 31 can be dispensed with if primary windings of the transformers 11 have sufficient inductance. The intermediate coils 33 can be dispensed with if secondary windings of the transformers 11 have sufficient inductance. The output coils 35 can be dispensed with if primary windings of the coupling transformers 23 have sufficient inductance. Furthermore, the circuit branches 25 of the converter units 17 on the input side and/or the converter units 21 on the output side from the exemplary embodiment shown in FIG. 1 can have differing numbers of switching modules 27, wherein these numbers are adapted to the desired input AC voltages and output AC voltages and input AC currents and output AC currents of the converter arrangement 1.

Despite the fact that the invention has been illustrated and described in greater detail by means of preferred exemplary embodiments, the invention is not limited by the disclosed examples and other variations can be derived therefrom by the person skilled in the art without departing from the scope of protection of the invention.

LIST OF REFERENCE NUMBERS 1 converter arrangement
3 turbine
5 generator
7 power supply system
9 direct converter on the input side
11 transformer
13 direct converter on the output side
15 input connection
17 converter unit on the input side
19 output connection
21 converter unit on the output side
23 coupling transformer 25 circuit branch
27 switching module
29 input coil
31 circuit branch coil
33 intermediate coil
35 output coil
37 switching unit
39 bridge branch capacitor
41 bipolar transistor with an insulated gate electrode
43 free-wheeling diode

The invention claimed is:

1. A converter arrangement for converting an input AC voltage with an input frequency into an output AC voltage with an output frequency, the converter arrangement comprising:
   a direct converter on an input side with a plurality of input connections and input-side converter units;
   a plurality of transformers, a number of said transformers corresponding to a number of said input connections;
   a direct converter on an output side with output-side converter units and a plurality of output connections, a number of said output connections corresponding to the number of said input connections; and
   each of said transformers having a primary side connected to a respective one of said input connections via a respective said input-side converter unit and having a secondary side connected to a respective one of said output connections via a respective said output-side converter unit.

2. The converter arrangement according to claim 1, wherein each of said input-side converter units has a plurality of parallel-connected circuit branches each having a plurality of series-connected switching modules, and each of said switching modules has a full bridge circuit with four switching units and a bridge branch capacitor arranged in a bridge branch of said full bridge circuit.

3. The converter arrangement according to claim 2, further comprising a circuit branch coil on a transformer side connected in series with each circuit branch of each input-side converter unit.

4. The converter arrangement according to claim 1, wherein each of said output-side converter units has a plurality of series-connected switching modules, and each of said switching modules has a full bridge circuit with four switching units and a bridge branch capacitor arranged in a bridge branch of said full bridge circuit.

5. The converter arrangement according to claim 4, wherein each of said switching units has a bipolar transistor with an insulated gate electrode and a free-wheeling diode connected in parallel to said bipolar transistor.

6. The converter arrangement according to claim 2, wherein each of said switching units has a bipolar transistor with an insulated gate electrode and a free-wheeling diode connected in parallel to said bipolar transistor.

7. The converter arrangement according to claim 1, further comprising an input coil connected between each said input-side converter unit and said input connection connected to said converter unit.

8. The converter arrangement according to claim 1, further comprising an intermediate coil connected between each said output-side converter unit and said transformer connected to said converter unit.

9. The converter arrangement according to claim 1, further comprising an output coil connected between each said output-side converter unit and said output connection connected to said converter unit.

10. The converter arrangement according to claim 1, further comprising:
    an input coil connected between each said input-side converter unit and said input connection connected to said converter unit;
    an intermediate coil connected between each said output-side converter unit and said transformer connected to said converter unit; and
    an output coil connected between each said output-side converter unit and said output connection connected to said converter unit.

11. The converter arrangement according to claim 1, wherein the input frequency and the output frequency are different from one another.

12. A method of converting an input AC voltage having an input frequency into an output AC voltage having an output frequency, the method comprising:
    providing the converter arrangement according to claim 1;
    increasing the input frequency to an intermediate frequency with the input-side direct converter, and transforming the intermediate frequency to the output frequency with the output-side direct converter.

13. A method of coupling a generator to a power supply system, the method comprising:
    providing the converter arrangement according to claim 1;
    connecting an input side of the converter arrangement to the generator; and
    connecting an output side of the converter arrangement to the power supply system.

14. The method according to claim 13, which comprises connecting each phase of a generator output voltage of the generator to an input connection of the converter arrangement, and connecting each phase of a line voltage of the power supply system to an output connection of the converter arrangement.

15. The method according to claim 14, which comprises connecting each output connection of the converter arrangement to a respective phase of the power supply system via a coupling transformer.

* * * * *